United States Patent
Huang et al.

(10) Patent No.: US 9,496,767 B2
(45) Date of Patent: Nov. 15, 2016

(54) MOTOR AND MOTOR VIBRATION-PROOF MECHANISM THEREOF

(71) Applicant: SUNONWEALTH ELECTRIC MACHINE INDUSTRY CO., LTD., Kaohsiung (TW)

(72) Inventors: Shih-Chang Huang, Kaohsiung (TW); Chih-Hao Mai, Kaohsiung (TW)

(73) Assignee: SUNONWEALTH ELECTRIC MACHINE INDUSTRY CO., LTD., Kaohsiung (TW)

( * ) Notice: Subject to any disclaimer, the term of this patent is extended or adjusted under 35 U.S.C. 154(b) by 285 days.

(21) Appl. No.: 14/258,491

(22) Filed: Apr. 22, 2014

(65) Prior Publication Data
US 2015/0155756 A1    Jun. 4, 2015

(30) Foreign Application Priority Data
Nov. 29, 2013  (TW) .............................. 102143888 A

(51) Int. Cl.
*H02K 5/24* (2006.01)

(52) U.S. Cl.
CPC ...................................... *H02K 5/24* (2013.01)

(58) Field of Classification Search
CPC ............ F16F 15/08; H02K 5/24; H02K 7/04
USPC .............................. 310/51, 62, 63
See application file for complete search history.

(56) References Cited

U.S. PATENT DOCUMENTS

| | | | | |
|---|---|---|---|---|
| 5,133,617 A * | 7/1992 | Sokn | .................... | F04D 29/626 403/343 |
| 5,533,704 A * | 7/1996 | Fischinger | ............ | F04D 29/668 248/603 |
| 7,876,009 B2 * | 1/2011 | Baranowski | ............. | H02K 5/24 123/41.49 |
| 7,976,292 B2 * | 7/2011 | Horng | ................... | F04D 29/526 310/88 |
| 8,277,203 B2 * | 10/2012 | Horng | ................... | F04D 19/002 417/353 |
| 2008/0180911 A1 | 7/2008 | Kaneko et al. | | |

FOREIGN PATENT DOCUMENTS

| | | |
|---|---|---|
| CN | 101304198 A | 11/2008 |
| EP | 2075472 | 7/2009 |
| EP | 2642072 | 3/2013 |
| WO | WO 0054392 | 9/2000 |
| WO | WO 2009032102 | 3/2009 |
| WO | WO2009032102 A1 | 3/2009 |
| WO | WO 2009079899 | 7/2009 |

OTHER PUBLICATIONS

Office Action issued on Jul. 7, 2015 by TIPO for the corresponding TW Patent Application No. 102143888.
Search Report issued on Jul. 7, 2015 by TIPO for the corresponding TW Patent Application No. 102143888.
English translation of the Search Report issued on Jul. 7, 2015 by TIPO for the corresponding TW Patent Application No. 102143888.
Office Action and Search Report issued on Aug. 18, 2016 by China Intellectual Property Office for the corresponding China Patent Application No. 201410066452.X.
English abstract translation of CN101304198A.

\* cited by examiner

*Primary Examiner* — Hanh Nguyen
(74) *Attorney, Agent, or Firm* — WPAT, P.C., Intellectual Property Attorneys; Anthony King

(57) ABSTRACT

A motor includes an outer frame, a vibration-proof base, and a motor body. The outer frame includes a supporting base. The vibration-proof base is disposed at the supporting base of the outer frame and includes a base body and a vibration-proof ring. The base body includes an upper surface and a side surface. The vibration-proof ring is sleeved around the side surface of the base body. The vibration-proof ring is in contact with the supporting base. The motor body is disposed on the base body. The disclosure can greatly reduce vibration generated in the operation of the motor and reduce noises.

22 Claims, 3 Drawing Sheets

MOTOR AND MOTOR VIBRATION-PROOF MECHANISM THEREOF

FIELD

The disclosure relates to a motor and a motor vibration-proof mechanism for reducing vibration generated in the operation of the motor.

BACKGROUND

It is known that, vibration generated in an operation process of a motor is the main reason for the motor generating noises. Therefore, to reduce the vibration generated when the motor operates, it is known that a damping block is used to eliminate vibration energy in the operation of the motor. However, the foregoing damping block can only reduce partial vibration energy in the operation of the motor, and therefore, the vibration-proof effect is limited.

Therefore, it is necessary to provide a motor and a motor vibration-proof mechanism, to solve the foregoing problem.

SUMMARY OF THE INVENTION

In accordance with one aspect of the present disclosure, a motor includes an outer frame, a vibration-proof base and a motor body. The outer frame includes a supporting base. The vibration-proof base is disposed at the supporting base of the outer frame, and includes a base body and a vibration-proof ring. The base body includes an upper surface and a side surface. The vibration-proof ring is sleeved around the side surface of the base body; and the vibration-proof ring is in contact with the supporting base. The motor body is disposed on the base body.

In accordance with another aspect of the present disclosure, a motor vibration-proof mechanism includes an outer frame and a vibration-proof base. The outer frame includes a supporting base. The vibration-proof base is disposed at the supporting base of the outer frame, and includes a base body and a vibration-proof ring. The base body includes an upper surface and a side surface. The vibration-proof ring is sleeved around the side surface of the base body; and the vibration-proof ring is in contact with the supporting base.

The present disclosure uses the vibration-proof ring to absorb whole vibration energy generated in the operation of the motor body, which thereby can greatly reduce vibration generated in the operation of the motor and reduce noises.

BRIEF DESCRIPTION OF THE DRAWINGS

Aspects of the present disclosure are understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION OF THE INVENTION

Figure 1:
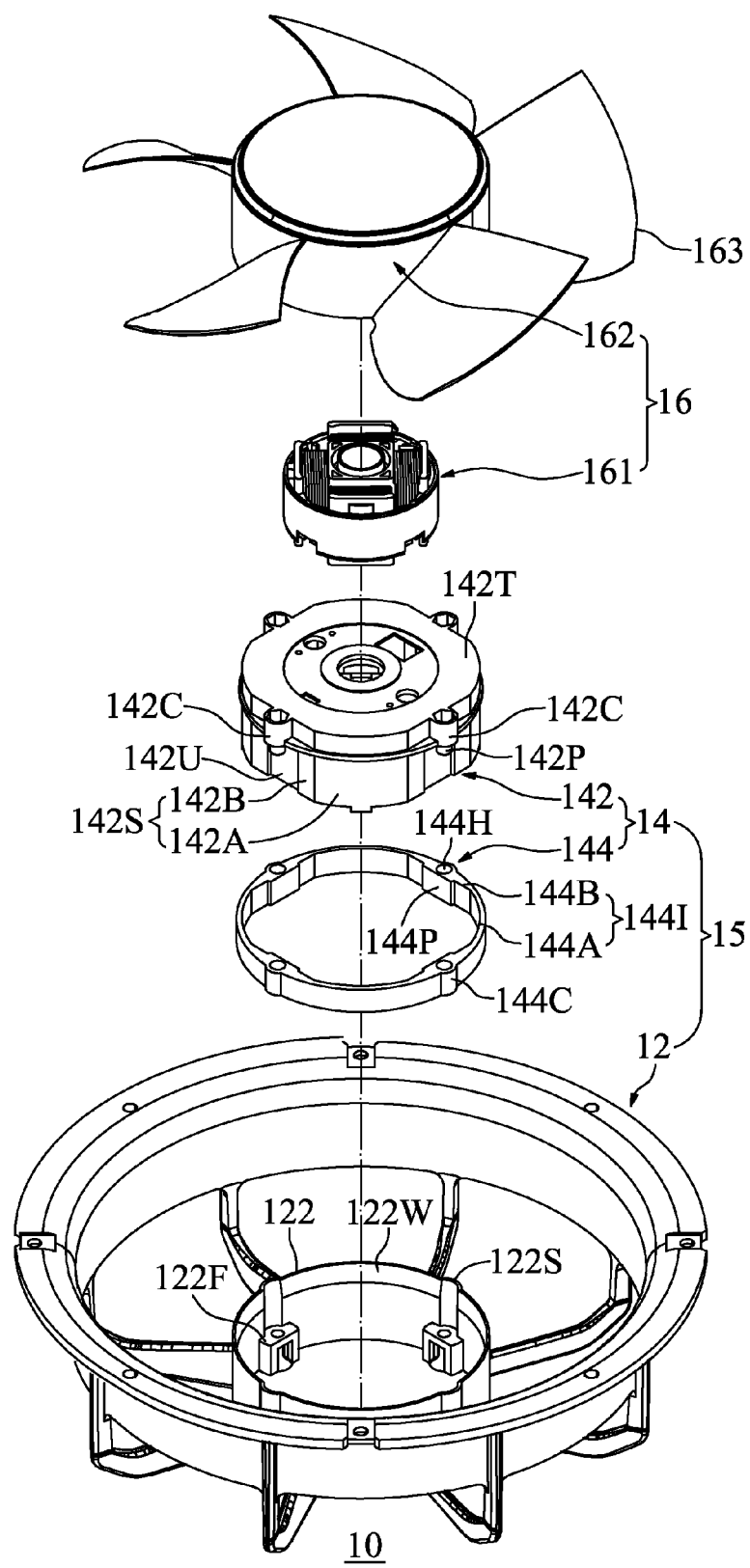
FIG. 1 illustrates an exploded perspective view of a motor in accordance with some embodiments of the present disclosure.

It is to be understood that the following disclosure provides many different embodiments or examples, for implementing different features of various embodiments. Specific examples of components and arrangements are described below to simplify the present disclosure. The present disclosure may, however, be embodied in many different forms and should not be construed as being limited to the embodiments set forth herein; rather, these embodiments are provided so that this description will be thorough and complete, and will fully convey the present disclosure to those of ordinary skill in the art. It will be apparent, however, that one or more embodiments may be practiced without these specific details.

In addition, the present disclosure may repeat reference numerals and/or letters in the various examples. This repetition is for the purpose of simplicity and clarity and does not in itself dictate a relationship between the various embodiments and/or configurations discussed.

It will be understood that when an element is referred to as being "on" another element, it can be directly on the other element or intervening elements may be present. In contrast, when an element is referred to as being "directly on" another element, there are no intervening elements present.

It will be understood that singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms; such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
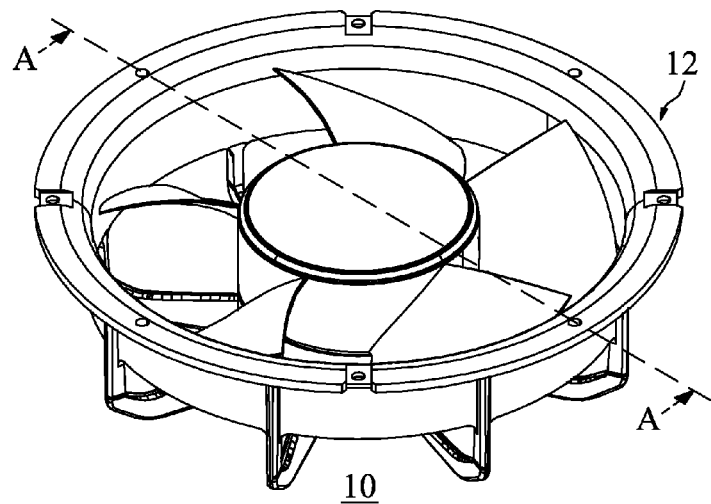
FIG. 2 illustrates a perspective view of a motor in accordance with some embodiments of the present disclosure.
Figure 3:
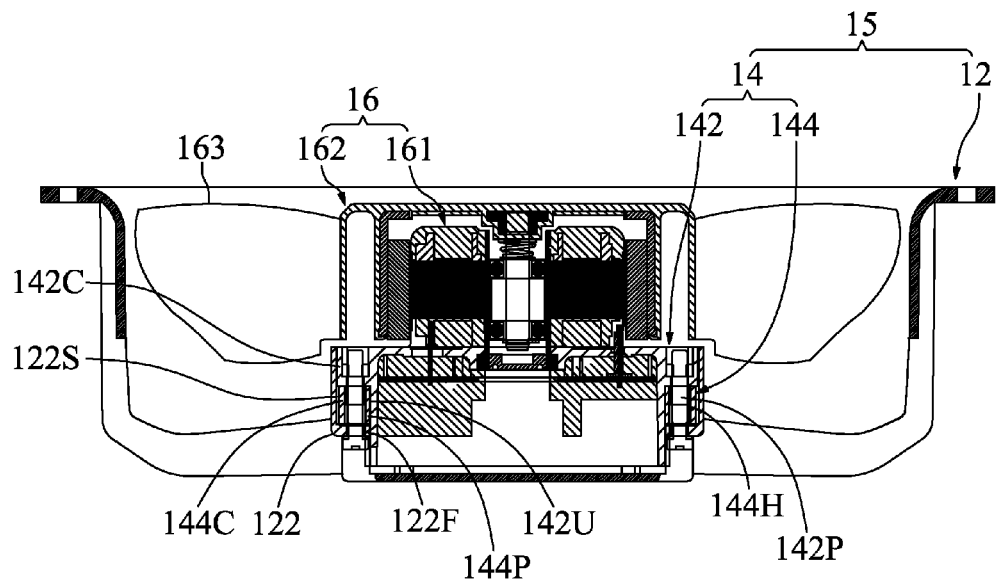
FIG. 3 illustrates a cross-sectional view along line A-A of FIG. 2.

FIG. 1 illustrates an exploded perspective view of a motor in accordance with some embodiments of the present disclosure. FIG. 2 illustrates a perspective view of a motor in accordance with some embodiments of the present disclosure. FIG. 3 illustrates a cross-sectional view along line A-A of FIG. 2. Referring to FIGS. 1, 2, and 3, the motor 10 in the present disclosure includes an outer frame 12, a vibration-proof base 14, and a motor body 16. In some embodiments, the motor body 16 includes a stator 161 and a hub 162, and the hub 162 may have a plurality of blades 163 which forms a fan.

The outer frame 12 includes a supporting base 122. The supporting base 122 includes a wall 122W and a plurality of fixing portions 122F disposed within the supporting base 122. In some embodiments, the wall 122W includes a plurality of positioning grooves 122S, and each fixing portion 122F is located at one end of each positioning groove 122S.

The vibration-proof base 14 is disposed at the supporting base 122 of the outer frame 12, and the vibration-proof base 14 includes a base body 142 and a vibration-proof ring 144.

The base body 142 includes an upper surface 142T, a side surface 142S, and a plurality of first pivot connecting portions 142C. The side surface 142S includes a plurality of cambered sections 142A and a plurality of plane sections 142B; each plane section 142B is located between two adjacent cambered sections 142A, and each plane section 142B includes a recession 142U. Each first pivot connecting portion 142C is protruded from each plane section 142B, and the first pivot connecting portions 142C are corresponding to the recessions 142U. In some embodiments, the motor body 16 is disposed on the upper surface 142T of the base body 142, and therefore, vibration energy generated in the operation of the motor body 16 can be transferred to the base body 142.

Figure 4:
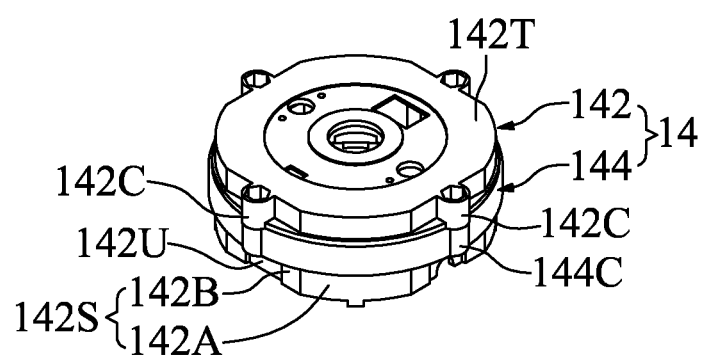
FIG. 4 illustrates a perspective view of a vibration-proof base in accordance with some embodiments of the present disclosure.

FIG. 4 illustrates a perspective view of a vibration-proof base in accordance with some embodiments of the present disclosure. Referring to FIGS. 1, 3, and 4, the vibration-proof ring 144 is sleeved around the side surface 142S of the base body 142, and the vibration-proof ring 144 is in contact with the supporting base 122. In some embodiments, the vibration-proof ring 144 is in contact with the fixing portions 122F of the supporting base 122. In some embodiments, the vibration-proof ring 144 is made of elastic material selected from the group consisting of rubber and silica gel.

The vibration-proof ring 144 includes an inner side wall 144I and a plurality of second pivot connecting portions 144C. In some embodiments, the inner side wall 144I includes a plurality of cambered wall sections 144A and a plurality of plane wall sections 144B; the cambered wall sections 144A are corresponding to the cambered sections 142A of the side surface 142S; and the plane wall sections 144B are corresponding to the plane sections 142B of the side surface 142S.

The second pivot connecting portions 144C are corresponding to the first pivot connecting portions 142C of the base body 142 and the recessions 142U of the plane sections 142B, and the second pivot connecting portion 144C is located between the fixing portion 122F of the supporting base 122 and the first pivot connecting portion 142C of the base body 142. To prevent the vibration-proof ring 144 from detaching the base body 142, in some embodiments, each second pivot connecting portion 144C of the vibration-proof ring 144 includes a pivot connecting hole 144H, and each first pivot connecting portion 142C of the base body 142 includes a convex connecting block 142P. Therefore, the situation that the vibration-proof ring 144 detaches from the base body 142 can be prevented by inserting the convex connecting blocks 142P of the first pivot connecting portions 142C into the pivot connecting holes 144H of the second pivot connecting portions 144C.

In some embodiments, each second pivot connecting portion 144C further includes a convex block 144P, and the convex block 144P of each second pivot connecting portion 144C is protruded from each plane wall section 144B. To make the vibration-proof ring 144 effectively absorb the vibration energy born by the base body 142, in some embodiments, the convex blocks 144P of the second pivot connecting portions 144C are clamped at the recessions 142U of the plane sections 142B.

In addition, to prevent the base body 142 and the vibration-proof ring 144 from rotating to influence vibration-proof effect, in some embodiments, the second pivot connecting portions 144C of the vibration-proof ring 144 and the first pivot connecting portions 142C of the base body 142 are clamped at the positioning grooves 122S of the wall 122W. In some embodiments, a screw (not shown in the drawings) can be set in each first pivot connecting portion 142C of the base body 142 and each second pivot connecting portion 144C of the vibration-proof ring 144, so that the base body 142 and the vibration-proof ring 144 can be fixed on the fixing portions 122F of the supporting base 122 by using the screw.

According to the present disclosure, the outer frame 12 and the vibration-proof base 14 are used to form a motor vibration-proof mechanism 15, and the motor vibration-proof mechanism 15 is used for absorbing whole vibration energy generated in the operation of the motor body 16, which thereby can greatly reduce vibration generated in the operation of the motor and reduce noises.

Moreover, the scope of the present application is not intended to be limited to the particular embodiments of the process, machine, manufacture, and composition of matter, means, methods and steps described in the specification. As those skilled in the art will readily appreciate form the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure.

Accordingly, the appended claims are intended to include within their scope such processes, machines, manufacture, and compositions of matter, means, methods or steps. In addition, each claim constitutes a separate embodiment, and the combination of various claims and embodiments are within the scope of the invention.

What is claimed is:

1. A motor, comprising:
   an outer frame including a supporting base, wherein the supporting base includes a wall and a plurality of fixing portions disposed within the supporting base; the wall includes a plurality of positioning grooves; and each fixing portion is located at one end of each positioning groove;
   a vibration-proof base, disposed at the supporting base of the outer frame, including a base body and a vibration-proof ring, wherein the base body includes an upper surface and a side surface; the vibration-proof ring is sleeved around the side surface of the base body; and the vibration-proof ring is in contact with the supporting base; and
   a motor body disposed on the base body.

2. The motor of claim 1, wherein the supporting base includes a plurality of fixing portions disposed within the supporting base, and the vibration-proof ring is in contact with the fixing portions of the supporting base.

3. The motor of claim 2, wherein the base body and the vibration-proof ring are fixed on the fixing portions of the supporting base.

4. The motor of claim 2, wherein the base body includes a plurality of first pivot connecting portions; the vibration-proof ring includes a plurality of second pivot connecting portions; the second pivot connecting portions of the vibration-proof ring are corresponding to the first pivot connecting portions of the base body; and the second pivot connecting portion of the vibration-proof ring is located between the fixing portion of the supporting base and the first pivot connecting portion of the base body.

5. The motor of claim 4, wherein the side surface of the base body includes a plurality of cambered sections and a plurality of plane sections; each plane section is located between two adjacent cambered sections; and each first pivot connecting portion is protruded from each plane section.

6. The motor of claim 4, wherein the side surface of the base body includes a plurality of cambered sections and a plurality of plane sections; each plane section is located between two adjacent cambered sections and includes a recession; and the second pivot connecting portions of the vibration-proof ring are corresponding to the recessions of the plane sections.

7. The motor of claim 6, wherein each second pivot connecting portion of the vibration-proof ring includes a convex block, and the convex blocks of the second pivot connecting portions are clamped at the recessions of the plane sections.

8. The motor of claim 7, wherein the vibration-proof ring includes an inner side wall, and the inner side wall includes a plurality of cambered wall sections and a plurality of plane wall sections; the cambered wall sections are corresponding to the cambered sections of the side surface; the plane wall sections are corresponding to the plane sections of the side surface; and the convex block of each second pivot connecting portion is protruded from each plane wall section.

9. The motor of claim 4, wherein each second pivot connecting portion of the vibration-proof ring includes a pivot connecting hole; each first pivot connecting portion of the base body includes a convex connecting block; and the convex connecting blocks of the first pivot connecting portions are inserted into the pivot connecting holes of the second pivot connecting portions.

10. The motor of claim 1, wherein the base body includes a plurality of first pivot connecting portions; the vibration-proof ring includes a plurality of second pivot connecting portions; the second pivot connecting portions of the vibration-proof ring are corresponding to the first pivot connecting portions of the base body; and the second pivot connecting portions of the vibration-proof ring and the first pivot connecting portions of the base body are clamped at the positioning grooves of the wall.

11. The motor of claim 1, wherein the motor body is disposed on the upper surface of the base body.

12. The motor of claim 1, wherein the vibration-proof ring is made of elastic material selected from the group consisting of rubber and silica gel.

13. A motor vibration-proof mechanism, comprising:
an outer frame including a supporting base, wherein the supporting base includes a wall and a plurality of fixing portions disposed within the supporting base; the wall includes a plurality of positioning grooves; and each fixing portion is located at one end of each positioning groove; and
a vibration-proof base, disposed at the supporting base of the outer frame, including a base body and a vibration-proof ring, wherein the base body includes an upper surface and a side surface; the vibration-proof ring is sleeved around the side surface of the base body; and the vibration-proof ring is in contact with the supporting base.

14. The motor vibration-proof mechanism of claim 13, wherein the supporting base includes a plurality of fixing portions disposed within the supporting base, and the vibration-proof ring is in contact with the fixing portions of the supporting base.

15. The motor vibration-proof mechanism of claim 14, wherein the base body and the vibration-proof ring are fixed on the fixing portions of the supporting base.

16. The motor vibration-proof mechanism of claim 14, wherein the base body includes a plurality of first pivot connecting portions; the vibration-proof ring includes a plurality of second pivot connecting portions; the second pivot connecting portions of the vibration-proof ring are corresponding to the first pivot connecting portions of the base body; and the second pivot connecting portion of the vibration-proof ring is located between the fixing portion of the supporting base and the first pivot connecting portion of the base body.

17. The motor vibration-proof mechanism of claim 16, wherein the side surface of the base body includes a plurality of cambered sections and a plurality of plane sections; each plane section is located between two adjacent cambered sections; and each first pivot connecting portion is protruded from each plane section.

18. The motor vibration-proof mechanism of claim 16, wherein the side surface of the base body includes a plurality of cambered sections and a plurality of plane sections; each plane section is located between two adjacent cambered sections and includes a recession; and the second pivot connecting portions of the vibration-proof ring are corresponding to the recessions of the plane sections.

19. The motor vibration-proof mechanism of claim 18, wherein each second pivot connecting portion of the vibration-proof ring includes a convex block, and the convex blocks of the second pivot connecting portions are clamped at the recessions of the plane sections.

20. The motor vibration-proof mechanism of claim 19, wherein the vibration-proof ring includes an inner side wall, and the inner side wall includes a plurality of cambered wall sections and a plurality of plane wall sections; the cambered wall sections are corresponding to the cambered sections of the side surface; the plane wall sections are corresponding to the plane sections of the side surface; and the convex block of each second pivot connecting portion is protruded from each plane wall section.

21. The motor vibration-proof mechanism of claim 16, wherein each second pivot connecting portion of the vibration-proof ring includes a pivot connecting hole; each first pivot connecting portion of the base body includes a convex connecting block; and the convex connecting blocks of the first pivot connecting portions are inserted into the pivot connecting holes of the second pivot connecting portions.

22. The motor vibration-proof mechanism of claim 13, wherein the base body includes a plurality of first pivot connecting portions; the vibration-proof ring includes a plurality of second pivot connecting portions; the second pivot connecting portions of the vibration-proof ring are corresponding to the first pivot connecting portions of the base body; and the second pivot connecting portions of the vibration-proof ring and the first pivot connecting portions of the base body are clamped at the positioning grooves of the wall.

* * * * *